(12) United States Patent
Moore

(10) Patent No.: US 7,232,347 B1
(45) Date of Patent: Jun. 19, 2007

(54) SEAL FOR CONFINED ELECTRICAL CONDUCTOR CABLE

(76) Inventor: Boyd B. Moore, 5226 Brittmore, Houston, TX (US) 77041

( * ) Notice: Subject to any disclaimer, the term of this patent is extended or adjusted under 35 U.S.C. 154(b) by 0 days.

(21) Appl. No.: 11/326,976

(22) Filed: Jan. 6, 2006

(51) Int. Cl.
*H01R 11/09* (2006.01)

(52) U.S. Cl. ......................................... 439/797; 174/89

(58) Field of Classification Search ............... 439/587, 439/589, 797, 798; 174/76, 77 R, 84 R, 174/89, 93, 845, DIG. 8
See application file for complete search history.

(56) References Cited

U.S. PATENT DOCUMENTS

| | | | | |
|---|---|---|---|---|
| 5,289,882 A | * | 3/1994 | Moore | 166/379 |
| 5,762,135 A | * | 6/1998 | Moore | 166/65.1 |
| 5,804,767 A | * | 9/1998 | Winfield et al. | 174/74 R |
| 5,823,256 A | * | 10/1998 | Moore | 166/65.1 |
| 6,202,743 B1 | * | 3/2001 | Moore | 166/65.1 |
| 6,558,178 B2 | * | 5/2003 | Nakamura | 439/271 |
| 7,040,909 B2 | * | 5/2006 | Cairns | 439/271 |

* cited by examiner

*Primary Examiner*—Thanh-Tam Le
(74) *Attorney, Agent, or Firm*—Fulbright & Jaworski, LLP

(57) ABSTRACT

The present invention relates to a seal for an electric cable that is connected to a second cable in a confined location, in which a first and second lengths of insulated electrical cable extend into a confined location and a connector connects the first and second lengths of cable, and a method for forming such a seal. A thin layer of conductive material covers a first portion of the first length of insulated electrical cable, with a second portion of the insulated electrical cable projecting beyond the conductive material for connection to the connector and providing an exposed end of the conductive material.

17 Claims, 5 Drawing Sheets

SEAL FOR CONFINED ELECTRICAL CONDUCTOR CABLE

BACKGROUND OF THE INVENTION

1. Field of the Invention

The present invention relates to an improved seal for portions of electrical conductor cables from an external power source, that are connected in a confined location in hazardous locations to corresponding conductor cables for electrical equipment such as submersible pumps in underground wells, instrumentation, heaters, or any other suitable electrical equipment, both underground and above ground. Such seals are used to prevent gas and other combustible fluids from migrating from the electrical equipment into the conductor cable.

The invention is particularly useful for shielded electrical cable used in hazardous electrical locations, where the cable must be sealed on order to prevent migration of gas or other combustible fluids into the cables, conduits or raceways to a non-hazardous location, in order to comply with the requirements of the National Electric Code's Hazardous Section 501.5(f)(3), for Class 1, Div. 1 and Div. 2 hazardous locations.

2. Background of the Invention

In installations in which electrical equipment is used in hazardous locations, such as for example underground wells and refineries, electrical power is supplied from an external source to electrical equipment through insulated conductors that extend into a confined location such as a closed housing where the conductor cable is spliced or otherwise connected to conductor cable that runs to the equipment. This confined area forms a closed transition zone for the cables and house their connections. The portions of the cable conductor from the external power source must be sealed in order to block gases and other combustible fluids that emanate from the equipment, from flowing to the external power source along the conductor cables and cause an explosion.

The housing that confines the connections and seals are located in a hazardous location called a "classified" location. Such locations are referred to as "classified" because they are defined or classified by industry standards such those promulgated by the American Petroleum Institute. The equipment and facilities for such classified locations must be in compliance with the Occupational Safety and Health Act ("OSHA") Section 1910, Subpart S, for locations where hazardous concentrations of gases or vapors are present because of leakage.

Recent changes to the National Electric Code ("NEC") require that all medium voltage ("MV") cable (C-L-X Type MC-HL cables) used in Classes I, II and III, Division 1 and 2, and Class I, Zone 1 and 2 hazardous locations (NEC Articles 501, 502 and 503), must be shielded with a conductive material along its length. This change resulted in the use of a thin layer of uncoated copper tape wrapped around the length of each of the conductors that supplies electrical power to electrical equipment from an external power source.

However, the NEC changes did not address the problem of how to seal the shielded conductor in a confined location in order to prevent gases and other hazardous fluids from migrating along the conductor cable and into the power source and cause an explosion.

Thus, there is need for seal for a shielded conductor cable within such a confined location in order to eliminate a hazardous condition by preventing combustible gas and other fluids that emanate from electrical equipment and flow into the confined location, from migrating along the conductor cable to an electrical power source located outside the confined location.

BRIEF SUMMARY OF THE INVENTION

The present invention relates to a seal for an electric cable that is connected to a second cable in a confined location, in which first and second lengths of insulated electrical cable extend into a confined location and a connector connects the first and second lengths of cable. A thin layer of conductive material covers a first portion of the first length of insulated electrical cable, with a second portion of the insulated electrical cable projecting beyond the conductive material for connection to the connector and providing an exposed end of the conductive material.

A thin sealing layer of a fluid-impervious dielectric material extends from the connector to an opening in the confined location and covers the first length of insulated electrical cable, including the exposed end of the conductive material. A first fluid impervious seal is formed between the sealing layer and the connector and a second fluid impervious seal is formed between the sealing layer and the opening in the confined location.

A thin layer of semi-conductive material can be provided between the electrical cable and conductive material, extending beyond the exposed end of the conductive material but not extending along the entire second portion of the electric cable. The conductive material can include copper tape wrapped around the electrical cable and the layer of dielectric material can include a cold shrink silicone rubber. A coating of metal oxide putty can be provided between the sealing layer and the exposed end of the conductive material.

The confined location can be a closed housing. The first fluid impervious seal can include a rubber insulating boot, and the second fluid impervious seal can include an epoxy putty. Alternatively, the thin sealing layer can be formed of a plurality of sections, with adjacent sections overlapping each other.

The invention also includes a method for forming a seal for a shielded, insulated electrical cable in a hazardous location, which includes the step of inserting a first length of insulated electrical cable through an opening in a confined location, the length of insulated electrical cable including a thin layer of conductive material over its outer surface, the first length of cable further including a first end for connecting the cable through a conductive connector to a second length of electrical cable in the confined location. The layer of conductive material is trimmed so that the first electrical cable extends beyond an exposed end of the conductive material. A thin sealing layer of a fluid-impervious dielectric material is installed over a portion of the first electric cable sufficient to cover at least the layer of conductive material and the exposed end. A first fluid impervious seal is formed between the connector and the sealing layer, and a second fluid impervious seal is formed between the sealing layer and the opening in the confined location. The steps do not have be performed in this order as long as an effective seal is formed over the length of shielded electrical cable.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION OF A PREFERRED EMBODIMENT

The subject invention relates to a seal for the portion of shielded electrical conductor cable that is housed in a vessel or confinement containing combustible fluids. The cable is used to supply electrical power from an external source to equipment such as submersible pumps, instrumentation, heaters, or any other electrical equipment, both underground and above ground. The ends of the cable must be spliced or otherwise connected to separate conductor cable that runs to the equipment. The portion of the cable from the power source must be sealed within the confinement at every location where exposed portions might allow hazardous gas and other combustible fluids from the equipment to migrate out of the confinement and along the conductor cables to the external power source and cause an explosion.

Figure 1:
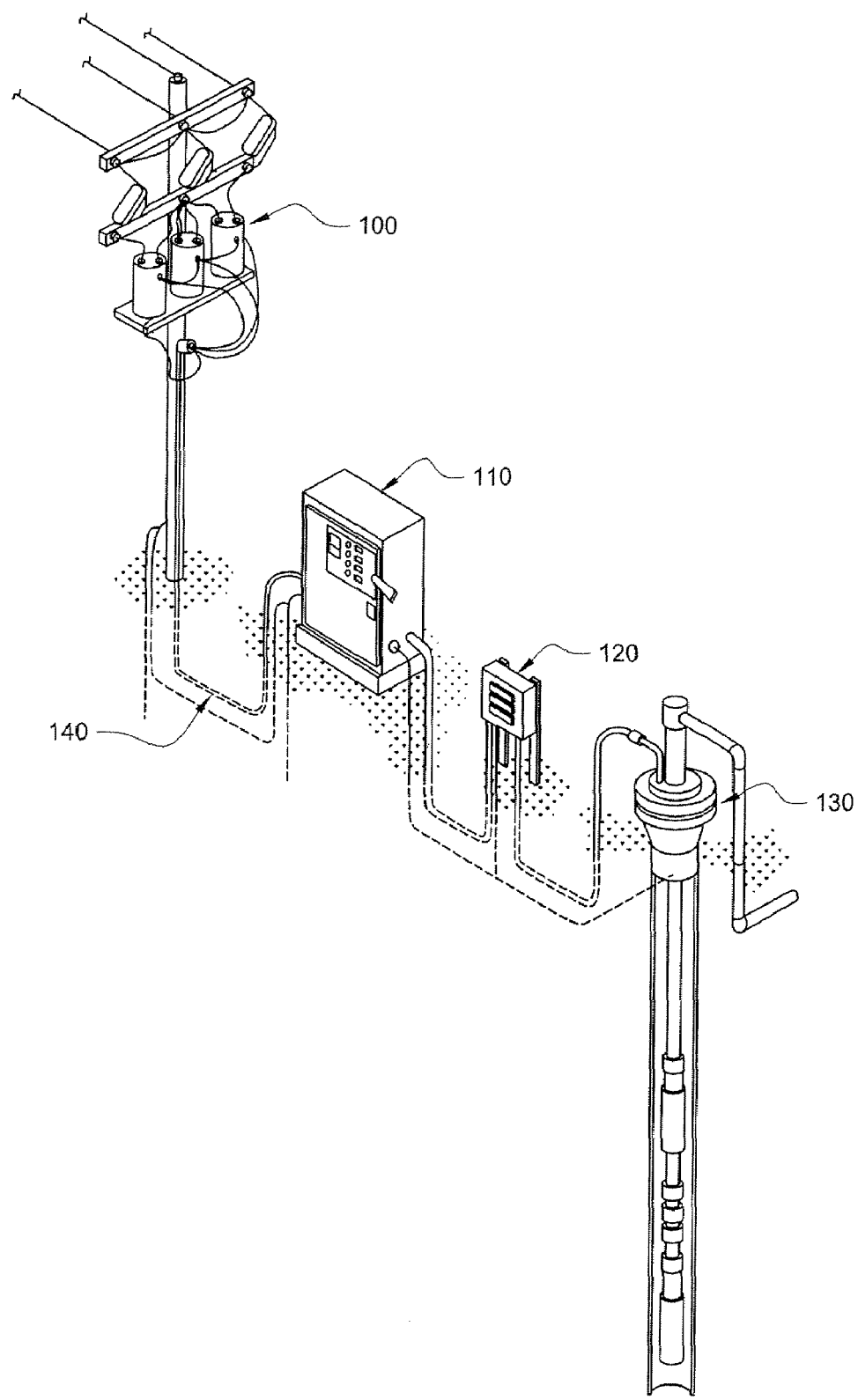
FIG. 1 is a schematic drawing of surface equipment for an underground well, which shows one environment for the present invention.

One use for the seal of the invention is in conjunction with conductor cables that supply power to equipment such as submersible pumps in underground wells, as shown in FIG. 1, where reference number 100 refers to a remote power source such as a transformer bank on a power pole for supplying power via a power cable 140, to a motor control panel 110. The power cable is typically formed of a medium voltage ("MV") electrical conductor cable that runs from the motor control panel 110 in a known way that is compliant with the NEC, to a vented junction box 120, and then to a wellhead barrier 130 of an underground well.

The remote power source is located in a safe zone, which is a zone outside a location adjacent to the well considered to be hazardous, which might contain gases and other fluids originating from the well. The term "hazardous location" as used herein is that area around a wellhead barrier that is classified as hazardous under industry standards as described above. The schematic diagram in FIG. 1 illustrates known equipment for supplying electrical power to an underground well.

The conductor cables that transmit electrical power from the remote power source TB are connected to conductor cables that run down hole to electrical equipment such as submersible pumps (not shown). These connections are formed in the vicinity of the well head 130, in an isolated transition zone where a conductor cable from an external power source is spliced to the conductor cable that runs down hole. This embodiment of the invention relates to seals for the conductor cable from the external power source that prevent hazardous substances that might leak out of the well from migrating along the conductor cable and to the power source.

Figure 2:
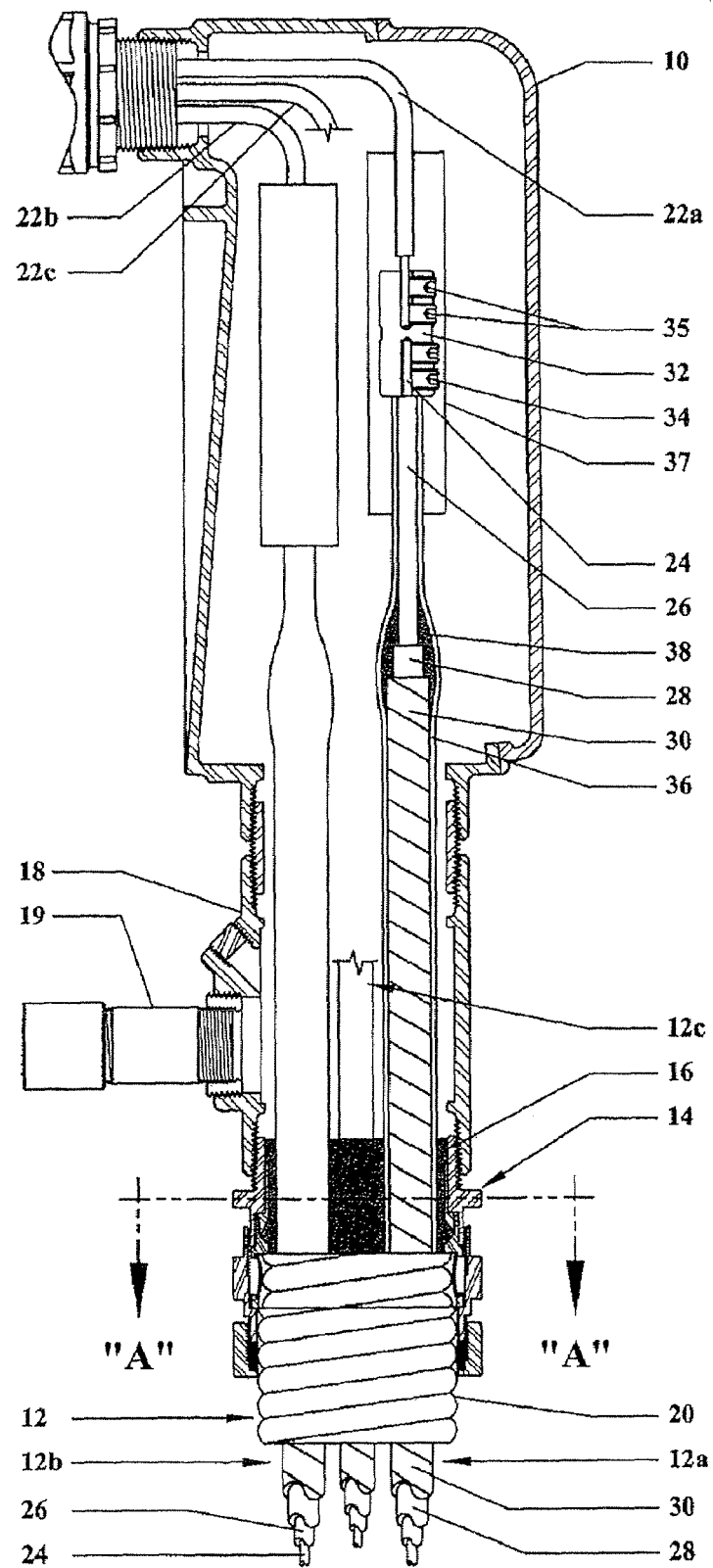
FIG. 2 is a front elevational view, partially in section, of a housing above the wellhead barrier of an underground well in which conductor cable from an external power source, which includes a seal made in accordance with the invention, is connected to conductor cable that runs to equipment in the well (not shown)

The connection between a conductor cable from a power source and conductor cable that runs to electrical equipment are located in a housing 10, as shown in FIG. 2. In the embodiment of the invention used in conjunction with an underground well, the housing 10 is located above the well head 130 and forms a protected confinement for connections between the conductor cables. These connections can be formed as splice connectors for connecting individual conductors 12a, 12b and 12c, of the conductor cable 12 from the external power source, to corresponding conductors 22a, 22b and 22c, of the conductor cable 22 that runs to down hole equipment. Although only two splice connectors is shown in FIG. 2, three would be used, one for each corresponding pair of conductors of the conductor cables 12a, 12b, 12c and 22a, 22b, 22c that need to be connected.

Figure 4:
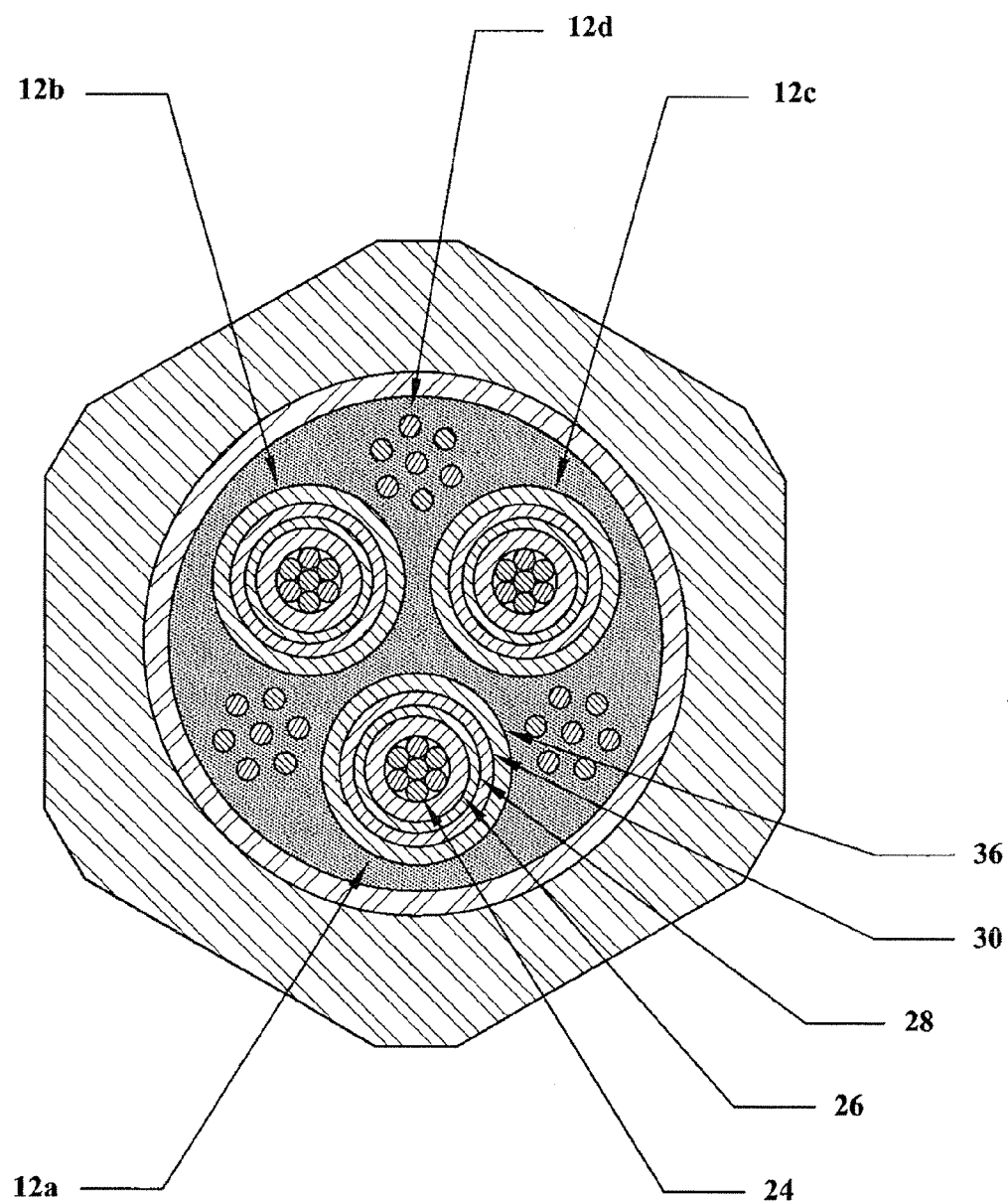
FIG. 4 is sectional view looking the section line "A"—"A" shown in FIG. 2.

The conductor cable 12 furnishes conventional three-phase power through the three insulated stranded conductors 12a, 12b and 12c, and includes uninsulated ground wires 12d (see FIG. 4). For underground wells, a cable that is typically used is C-L-X® Type MC-HL, ⅝ kv Okoguard® shielded power cable-aluminum sheath, sold by The Okonite Company, Ransay, N.J. Compliant conductor cables are also available from other manufactures. Other types and sizes of approved conductor cable can be used in accordance with the invention.

Figure 3:
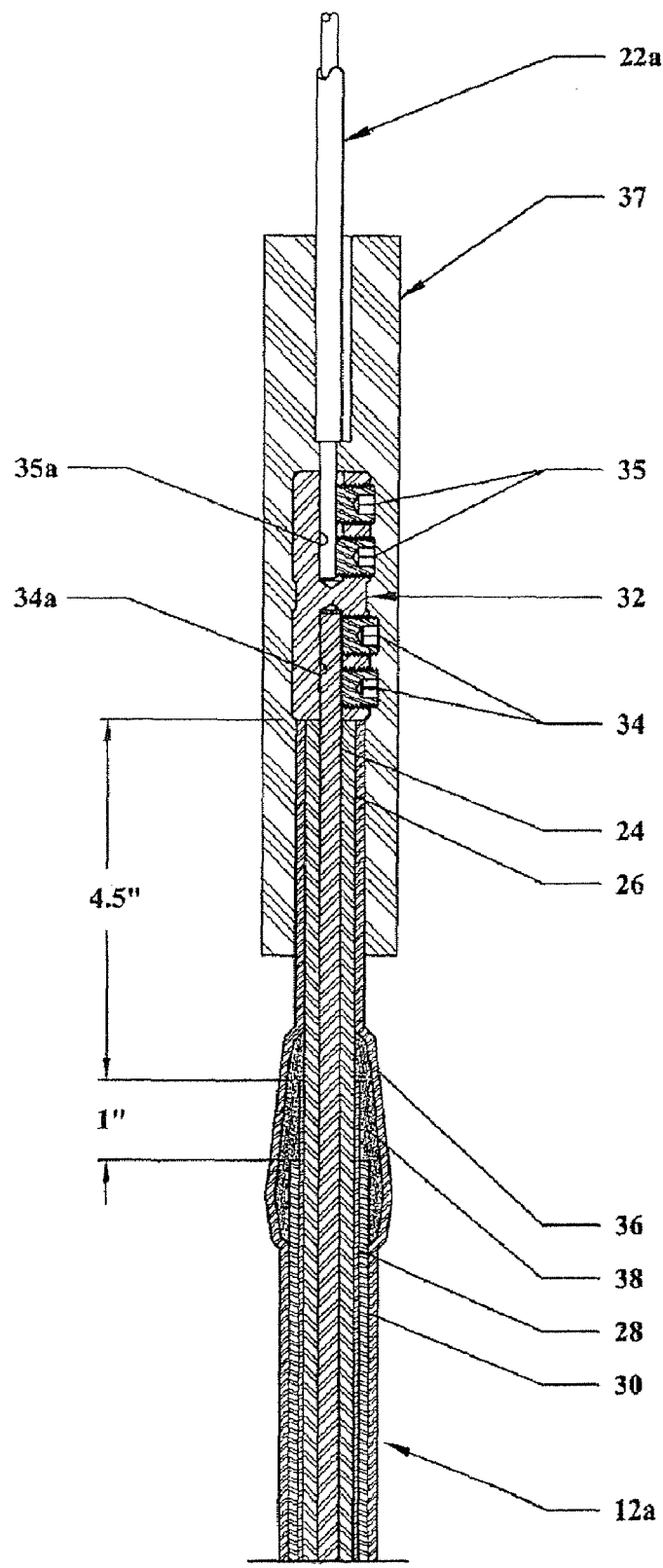
FIG. 3 is an elevational view, partially in section, of the seal of the present invention.

The cable conductors 12a, 12b and 12c, are clad in an outer protective coating 20, formed of continuous corrugated aluminum armor, which is covered with an impervious PVC jacket 21. As illustrated in FIGS. 3 and 4, where only the conductor 12a is illustrated in detail, the conductors 12a, 12b and 12c, are formed of multiple strands of copper conductors 24 that are covered with an insulation layer 26 which is separated from the conductors by a thin layer of a dielectric material (not shown) formed of ethylene-propylene-rubber ("EPR"), which is known as a strand screen. The insulation layer 26 is covered by a thin semi-conductive layer 28 formed of EPR, which in turn is covered by a thin shielding layer 30 formed of a conductive material such as uncoated copper tape.

The conductor cable 12 is inserted into the housing 10 through an internal seal termination 14, which is preferably a cable gland seal of the type sold by Hawke International USA, Houston, Tex. A seal 16 is formed in the termination 14 in order to seal the conductor cable, which is described in detail below.

The conductors 12a, 12b and 12c, extend into the housing 10 through a conduit seal fitting or Tee 18, in which a breather tube 19 is mounted for venting gases and other fluids from the well in the event of a failure of a primary seal located in the wellhead (not shown). The Tee 18 forms a pathway for the conductors 12a, 12b and 12c, into the housing 10.

Splices in the housing 10 connect the conductors 12a, 12b and 12c, from the external power source, to corresponding conductors 22a, 22b and 22c, of the conductor cable 22 that run to the down hole equipment. Such splices are known and are described in detail in U.S. Pat. Nos. 5,289,882 and 6,202,743, the subject matter of which is incorporated herein by reference. Splices of this type have been approved by Factory Mutual Research Corporation, which is a nationally recognized testing laboratory, for locations classified as hazardous.

As shown in FIGS. 2 and 3, the splices include a splice connector 32 formed of a conductive material such as copper, a first set of set screws 34 to rigidly hold uninsulated ends of the conductors 12a, 12b and 12c, at one end in a blind hole 34a, and a second set of set screws 35 to rigidly hold uninsulated ends of the conductors 22a, 22b, and 22c, at the other end in a blind hole 35a. The splice connector 32 and the conductors 12 and 22 are covered by a rubber insulating boot 37, as described in U.S. Pat. Nos. 5,289,882 and 6,202,743, after the conductors 12 and 22 are connected to the splice connector 32 as shown. The insulating boot 37 is preferably formed of a synthetic rubber, but can be formed of any elastomeric material with dielectric properties, that is resilient and resistant to well fluids.

As shown in FIG. 3, the conductors 12*a*, 12*b* and 12*c* are prepared before they are connected to the splice connector 32 by trimming the insulating layer 26 so that it will abut against the end of splice connector 32 when the exposed end of the conductor 12 is inserted into the blind hole 34*a* and secured by the set screws 34. The semi-conductive layer 28 and the shielding layer 30 are also trimmed, as shown in FIG. 3, at stepped intervals from the end of the splice connector 30.

The arrangement and configuration of the cables within the splice connector 32 is such that two sets of cables are not joined or engaged together so that the conductors of the cable 12 and 22 are isolated in order to inhibit combustible gas and/or liquids from the well bore that might emanate through the conductors 22*a*, 22*b* and 22*c*, from flowing along the conductors 12*a*, 12*b* and 12*c*, to the external power source.

Before a shielding layer 30 was used on the conductor cable 12, these gases and liquids were blocked from flowing along the conductors 12*a*, 12*b* and 12*c* to the external power source, by the insulating boot 37 at the splice connector 32, and by another seal formed of an epoxy putty that is packed around the conductors in the internal seal termination 14, which is described in greater detail below.

However, when the shielding layer 30 was added to the conductors the seals described above were not sufficient to block the flow of hazardous fluids along the conductors because the gases and other fluids could flow through gaps between the wrappings of the copper tape and between the copper tape and the adjacent layers. A proposed solution was to use a layer of an impervious shrink wrap material over the exposed end of the copper tape. However, this proposal was not satisfactory because it did not recognize that gases and other fluids could leak between adjacent wrappings of the copper tape outside the shrink wrap material, which was not apparent.

In order to solve this problem, a thin sealing layer 36, which is preferably formed of a relatively high strength dielectric material, is used to cover each one of the cable conductors 12*a*, 12*b* and 12*c*, and extend from the splice connectors 32 to the internal seal termination 14. A material for the sealing layer 36 found to be effective is MOD-3-TFT, sold by the Energy Division of Tyco Electronics Corporation, Fuquay-Varina, N.C. Another suitable material is QT-III, Cold Shrink Silicone Rubber sold by 3M Electrical Products Division, Austin, Tex. These materials are called cold shrink materials that can be installed in a known way by placing a tube of the material, which has been expanded to a relatively large diameter and held in its expanded state by an internal support (not shown), over the conductors 12*a*, 12*b* and 12*c*, and then removing the internal support. When the internal support is removed, the tube shrinks or reduces in diameter and provides a tight impervious seal over the material inside the tube.

Figure 5:
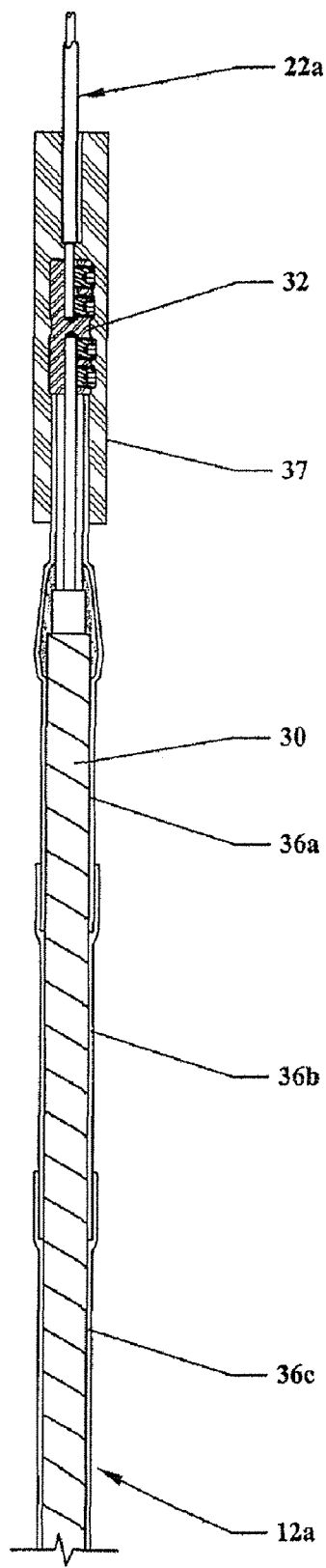
FIG. 5 is an elevational view, partially in section, of an alternative embodiment of the invention.

If a single length of the tube that forms the sealing layer 36 is not long enough to cover the entire length of the cable 12*a* in the housing 10, two or more sections 36*a*, 36*b*, 36*c*, etc., can be used by overlapping their respective ends as shown in FIG. 5.

As shown in FIG. 2, the sealing layer 36 should extend from the end of the splice connector 32, where it is sealed under the insulating boot 37, and into the internal seal 14 of the cable seal termination 16. A layer of a known stress control material 38 such as a metal oxide stress control patch sold by the Energy Division of Tyco Electronics Corporation, Fuquay-Varina, N.C., is packed around the exposed ends of the semi-conductive layer 28 and the shielding layer 30 before the sealing layer 36 is installed in order to provide support for the conductors 12 at the exposed ends of the semi-conductive layer 28 and the shielding layer 30.

As shown in FIG. 2, the armor cladding 20 and the PVC jacket 21 (not shown) are trimmed so that they extend into the termination 14. The sealing layer 36 on each of the conductors 12*a*, 12*b* and 12*c*, extends to and abuts against the exposed end of the conductor cable 12 at the termination of the armor cladding 20. The exposed ends of the sealing layers 36 and the exposed end of the conductor cable 12 are sealed in the termination 14 by a seal 16 formed of an epoxy putty that is packed around and between the sealing layers 36 and the internal surface of the termination 14.

The epoxy putty is preferably a hand-kneadable, two-part epoxy that hardens in a relatively short period of time after it is mixed and packed (for example, from 3–30 minutes). The putty must have a very low shrinkage upon hardening and also be resistant to well fluids. It must also have good dielectric qualities and be stable at temperatures up to at least 200° F. There are commercially-available putties of this type on the market from manufacturers such as Polymeric Systems, Inc., Phoenixville, Pa. and Glenmarc Manufacturing, Inc., Spring Grove, Ill. Other known poured or liquid epoxies or cements with these qualities could also be used. This arrangement provides a fluid tight seal between the individual conductors 12*a*, 12*b* and 12*c*, and the internal surface of the cable seal termination 14.

Thus, a tight fit is formed at one end of the sealing layers 36 by the insulating boot 37, and at the other end by the internal seal 16. Because the sealing layer 36 provides a tight protective covering over the exposed ends of the semi-conductive layer 28 and the shielding layer 30, hazardous materials such gas or flames are prevented from migrating along the various layers covering the conductors 12*a*, 12*b* and 12*c*, to the external power source.

The foregoing disclosure and description are intended to be illustrative and explanatory of the invention, thereof, and various changes in the size, shape and materials, as well as the details of the illustrated operation and construction may be made without departing from the spirit and scope of the invention.

What is claimed is:

1. A seal for an electric cable that is connected to a second cable in a confined location, comprising:
    a) a first length of insulated electrical cable extending through an opening in a confined location;
    b) a second length of insulated electrical cable extending into the confined location, wherein the first and second lengths of insulated electrical cable are from separate insulated electrical cables;
    c) a connector for connecting the first and second lengths of insulated electrical cable;
    d) a thin shielding layer of conductive material covering a first portion of the first length of insulated electrical cable, a second portion of the first length of insulated electrical cable projecting beyond the shielding layer of conductive material for connection to the connector, thereby providing an exposed end of the shielding layer of conductive material;

e) a thin sealing layer of a fluid-impervious dielectric material extending from the connector to the opening of the confined location and covering the first length of insulated electrical cable including the exposed end of the shielding layer of conductive material;

f) a first fluid impervious seal between the sealing layer of dielectric material and the connector; and g) a second fluid impervious seal between the sealing layer of dielectric material and the opening in the confined location.

2. The seal of claim 1, and further including a thin layer of semi-conductive material between the first length of insulated electrical cable and the shielding layer of conductive material, said layer of semi-conductive material extending beyond the exposed end of the shielding layer of conductive material but not extending along the entire second portion of the first length of insulated electrical cable.

3. The seal of claim 1, wherein the shielding layer of conductive material includes copper tape wrapped around the first portion of the first length of insulated electrical cable.

4. The seal of claim 1, wherein the sealing layer of dielectric material includes a cold shrink silicone rubber.

5. The seal of claim 1, and further including a coating of metal oxide putty between the sealing layer of dielectric material and the exposed end of the shielding layer of conductive material.

6. The seal of claim 1, wherein the confined location is a closed housing.

7. The seal of claim 1, wherein the first fluid impervious seal includes a rubber insulating boot.

8. The seal of claim 1, wherein second fluid impervious seal includes an epoxy putty.

9. The seal of claim 1, wherein the thin sealing layer of dielectric material is formed by a plurality of sections, with adjacent sections overlapping each other.

10. A method for forming a seal for a shielded, insulated electrical cable in a hazardous location, comprising the steps of:

a) inserting a first length of insulated electrical cable through an opening in a confined location, the first length of insulated electrical cable including a thin shielding layer of conductive material over its outer surface, the first length of cable further including a first end for connecting the first length of cable through a conductive connector to a second length of insulated electrical cable in the confined location, wherein the first and second lengths of insulated electrical cable are from separate insulated electrical cables;

b) trimming the shielding layer of conductive material so that the first length of insulated electrical cable extends beyond an exposed end of the shielding layer of conductive material;

c) installing a thin sealing layer of a fluid-impervious dielectric material over a portion of the first length of insulated electrical cable sufficient to cover at least the shielding layer of conductive material and the exposed end;

d) forming a first fluid impervious seal between the connector and the sealing layer of dielectric material; and e) forming a second fluid impervious seal between the sealing layer of dielectric material and the opening in the confined location.

11. The seal of claim 10, wherein the shielding layer of conductive material includes copper tape wrapped around the first length of insulating electrical cable.

12. The seal of claim 10, wherein the sealing layer of dielectric material includes a cold shrink silicone rubber.

13. The seal of claim 10, and further including the step of packing a coating of metal oxide putty between the sealing layer of dielectric material and the exposed end of the shielding layer of conductive material.

14. The seal of claim 10, wherein the confined location is a closed housing.

15. The seal of claim 10, wherein the first fluid impervious seal includes a rubber insulating boot.

16. The seal of claim 10, wherein second fluid impervious seal includes an epoxy putty.

17. The seal of claim 10, wherein the thin sealing layer of dielectric material is formed of a plurality of sections, with adjacent sections overlapping each other.

* * * * *